US007434750B2

(12) United States Patent
Roman

(10) Patent No.: US 7,434,750 B2
(45) Date of Patent: Oct. 14, 2008

(54) LIQUID DISPENSING PISTOL, IN PARTICULAR FOR GARDENING, PROVIDED WITH A DISPENSING POSITION LOCKING BUTTON

(75) Inventor: Gianfranco Roman, Pasiano (IT)

(73) Assignee: Claber S.p.A., Fiume Veneto (PN) (IT)

( * ) Notice: Subject to any disclaimer, the term of this patent is extended or adjusted under 35 U.S.C. 154(b) by 626 days.

(21) Appl. No.: 11/052,208

(22) Filed: Feb. 8, 2005

(65) Prior Publication Data

US 2005/0178857 A1 Aug. 18, 2005

(30) Foreign Application Priority Data

Feb. 13, 2004 (IT) .......................... MI2004A0240

(51) Int. Cl.

*B05B 7/02* (2006.01)
*B05B 9/01* (2006.01)
*B05B 1/30* (2006.01)
*F16K 35/00* (2006.01)

(52) U.S. Cl. ....................... 239/526; 239/583; 251/101; 251/107

(58) Field of Classification Search ................. 222/394, 222/402.14; 239/391, 394, 440, 446, 449, 239/525, 526, 569, 583, 586; 251/10, 75, 251/101, 107, 143, 285, 904

See application file for complete search history.

(56) References Cited

U.S. PATENT DOCUMENTS

| | | | | |
|---|---|---|---|---|
| 4,909,443 | A | 3/1990 | Takagi | 239/440 |
| 5,344,080 | A * | 9/1994 | Matsui | 239/449 |
| 5,377,412 | A * | 1/1995 | Schofield et al. | 30/262 |
| 5,501,400 | A | 3/1996 | Kuo | 239/394 |
| 5,967,421 | A * | 10/1999 | Wang | 239/526 |
| 5,967,422 | A * | 10/1999 | Wang | 239/526 |
| 6,032,922 | A * | 3/2000 | Shew | 251/99 |

FOREIGN PATENT DOCUMENTS

EP 0842705 A1 5/1998

* cited by examiner

*Primary Examiner*—Len Tran
*Assistant Examiner*—Ryan Reis
(74) *Attorney, Agent, or Firm*—Jacobson Holman PLLC

(57) ABSTRACT

A liquid spraying pistol for gardening including an external casing passed through by a channel within which a valve is slidingly housed which is biased by a spring and is operable by a start lever which is turnable between a closing position and a maximum opening position of said valve and a device for the locking/unlocking of said lever in the maximum opening position. The device is made up of a button elastically supported by the lever in such a way as to be able to provide, with the lever in the maximum opening position, a locking engagement between the lever and the external casing.

1 Claim, 3 Drawing Sheets

LIQUID DISPENSING PISTOL, IN PARTICULAR FOR GARDENING, PROVIDED WITH A DISPENSING POSITION LOCKING BUTTON

DESCRIPTION

The present invention concerns a liquid dispensing pistol, in particular for gardening, provided with a button for locking in dispensing position.

There are known spraying pistols provided with valves which allow the stopping of the flow of a liquid along a dispensing channel.

Said valves can be inside the zone where the user handles the pistol or in the top part of the same pistol.

In the first case the opening/closing of the valve is controlled by a start lever contrasted by a pre-charged spring.

In order for the flow of the liquid to be continuous it is necessary that the user pressure is constant. If extended spraying operations have to be carried out with the valve in maximum opening position the effort of the user can become unpleasant. In order to prevent this, there are known pistols in which means suitable to keep the start lever in open valve position are provided.

Object of the present invention is to provide a liquid spraying pistol provided with a device capable to maintain the valve open without any effort of the user.

According to the invention such object is attained with a liquid spraying pistol, in particular for gardening, comprising a external casing which is passed through by a channel, within which a valve is slidingly housed which is biased by a spring and is operable by a start lever turnable between a closing position and a maximum opening position of said valve, and a device for the locking/unlocking of said lever in maximum opening position, characterised in that said device is made up of a button elastically supported by said lever in such a way as to able to provide, with the lever in maximum opening position, a locking engagement between said lever and said external casing.

These and other characteristics of the present invention will be made evident from the following detailed description of an embodiment thereof which is illustrated as a non-limiting example in the enclosed drawing, in which.

Figure 1:
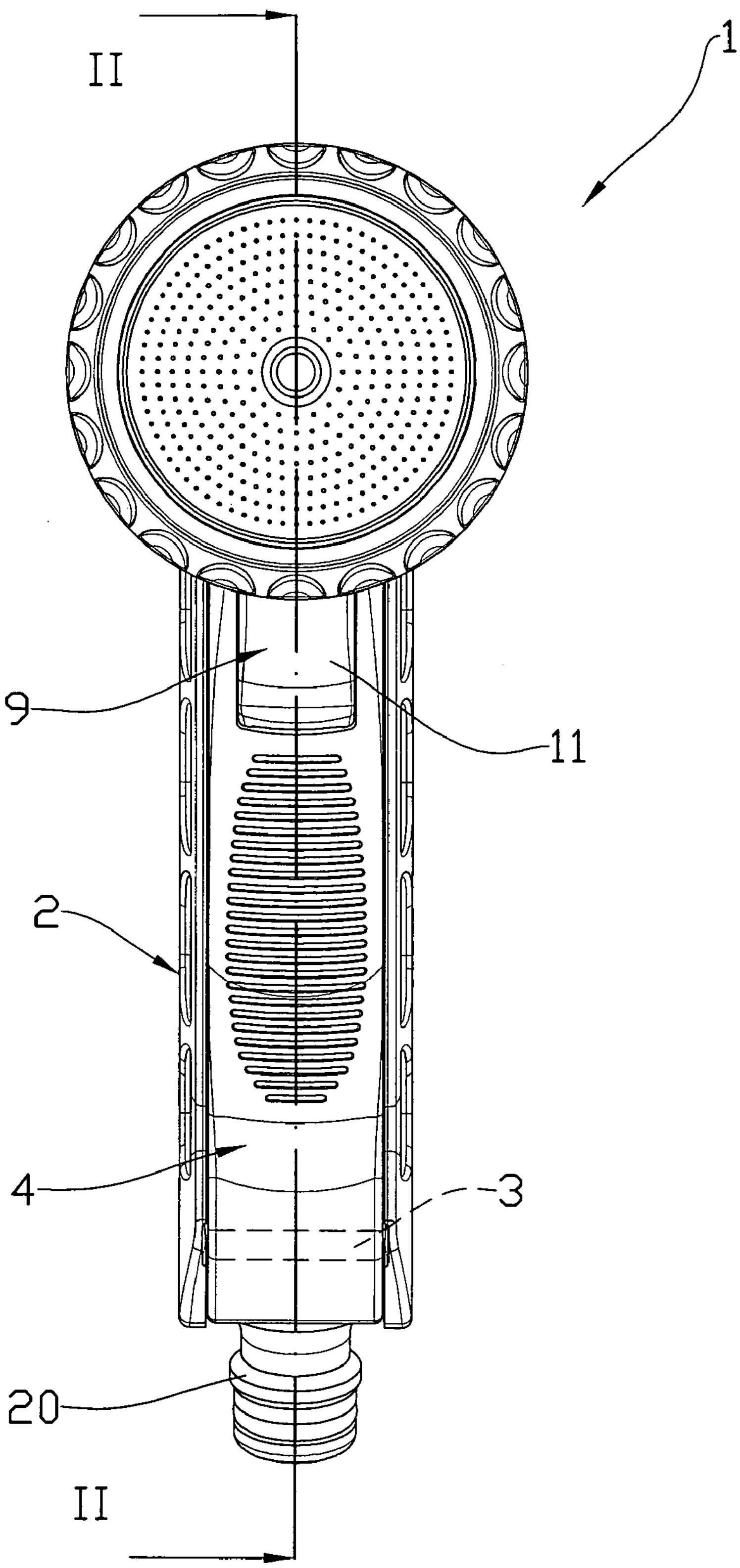
FIG. 1 shows a front view of a pistol according to the present invention.

In the drawings a pistol 1 for the spraying of liquid for gardening is shown which is made up of an external casing 2 formed by a pipe 22 and by a handle 23, the latter having a U-shape and supporting a pin 3 on which a start lever 4 is hinged.

Figure 2:
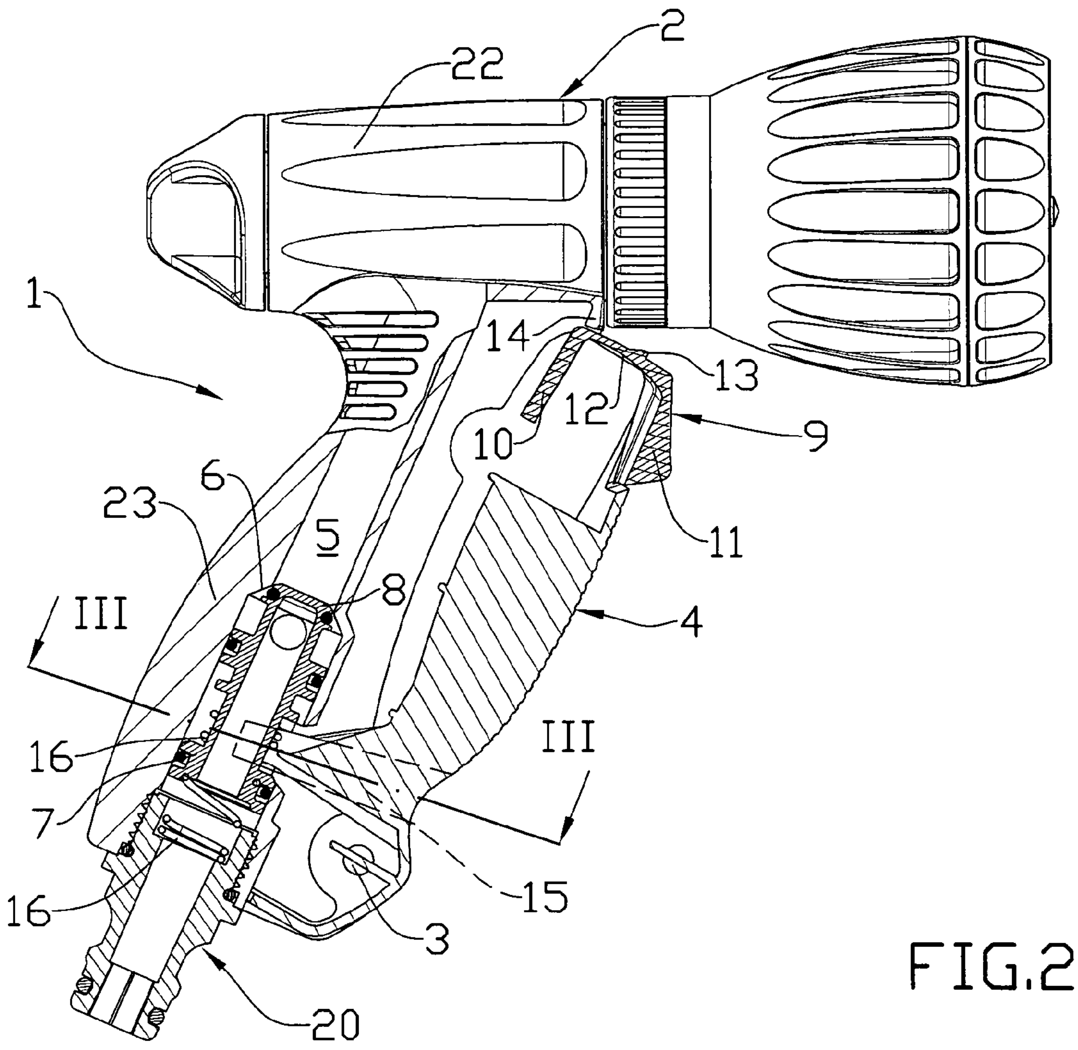
FIG. 2 shows a side view partially sectioned according to the line II-II of FIG. 1 with the start lever in closed valve position.
Figure 3:
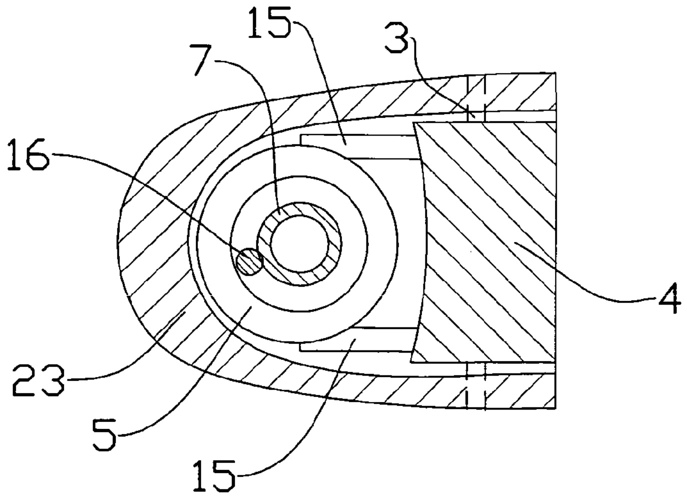
FIG. 3 shows a magnified section view according to the line III-III of FIG. 2.
Figure 4:
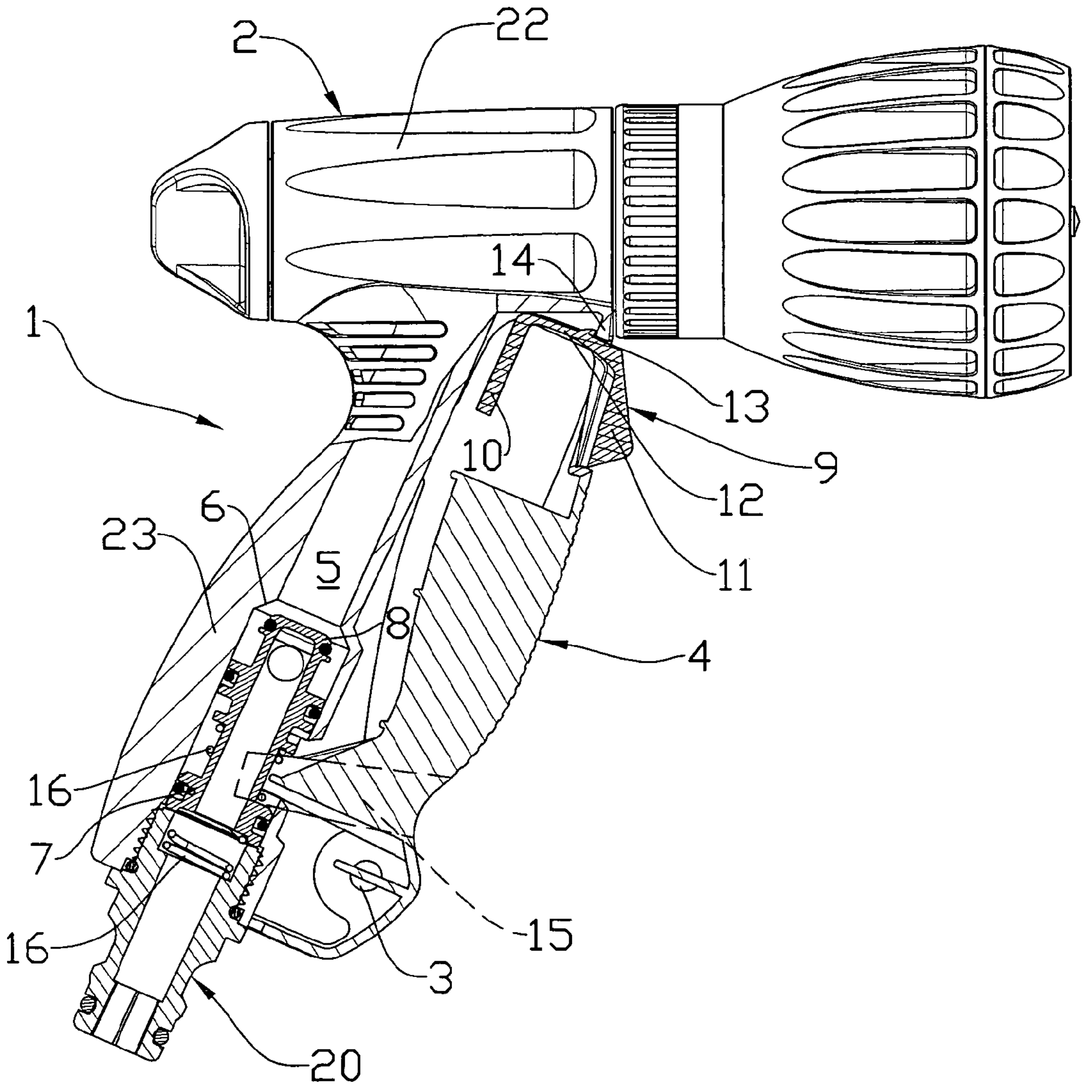
FIG. 4 shows a partially sectioned side view similar to FIG. 2 but with the start lever locked in open valve position by means of the locking button.

In FIGS. 2-4 a coupling element 20 for the coupling to a liquid dispensing hose and an internal channel 5 provided with an enlargement 6 inside of which a valve 7 having a head 8 and a compression precharged spring 16 wound around the body of the valve is clearly visible.

The lever 4 elastically supports a deformable lock/unlock button 9, substantially with a U-shape, being said U made up of parallel sides 10-11 and of a central coupling bridge 12. The side 10 is fixed in an appropriate housing obtained in the lever 4.

Said central bridge 12 has on its top part a projection with the shape of a tooth 13 which is engageable with a similar projection 14 integral with the pipe 22 of the external casing 2.

Rigid arms 15 integral with the lever 4 are engaged with the valve 7 in order to overcome, when required, the opposite force of the spring 16.

During operation, if assuming as initial position the one of FIG. 2 with the start lever 4 in rest position and the valve 7 completely closed, the user controls the rotation of the lever 4 around the pin 3, thereby causing the displacement of the arms 15, which thrust the valve 7 downward overcoming the opposite force of the spring 16 which is additionally charged by compression.

In this way the head 8 opens the communication between the channel 5 and the coupling 20, thus causing the passage of the liquid coming from the hose coupled to the same coupling.

If the start lever 4 is brought in the position of complete opening of the valve 7, the tooth 13 of button 9 passes the projection 14 of the pipe 22, by taking advantage to such purpose of the elastic deformability of the button 9, and it engages with the same projection in order to keep the lever 4 in the aforesaid maximum opening position (FIG. 4).

In order to unlock the start lever 4 and to bring it back into the rest position of FIG. 2 (valve 7 closed) it is sufficient to press with a finger the side 11 of the button 9, so that the tooth 13 disengages from the projection 14, thus allowing the lever 4 to rotate in opposite sense under the thrust of the spring 16.

The invention claimed is:

1. Liquid spraying pistol comprising an external casing passed through by a channel within which a valve is slidingly housed which is biased by a spring and is operable by a start lever which is turnable between a closing position and a maximum opening position of said valve and a device for the locking and unlocking of said lever in the maximum opening position, a button elastically supported by said lever in such a way as to be able to provide, with the lever in the maximum opening position, a locking engagement between said lever and said external casing, said button being elastically deformable and providing a tooth hookable to said external casing at the end of the opening rotation of said lever and disengageable from it by pressure operation of the user on the button, said button having an upside inverted "U" shape, being a first side of said U integral with said lever, a second side elastically deformable by pressure induced by a user, and finally a central bridge for the elastically deformable connection with a tooth-shaped projection on its top part to engage with a similar projection integral with the top part of the external casing.

* * * * *